United States Patent [19]

Fox et al.

[11] Patent Number: 4,507,442

[45] Date of Patent: Mar. 26, 1985

[54] COPOLYMERS AND PROCESS FOR THEIR PREPARATION

[75] Inventors: Daniel W. Fox; Bruce A. Kaduk; John B. Starr, Jr., all of Pittsfield, Mass.

[73] Assignee: General Electric Company, Pittsfield, Mass.

[21] Appl. No.: 400,902

[22] Filed: Jul. 22, 1982

Related U.S. Application Data

[63] Continuation of Ser. No. 188,177, Sep. 17, 1980, abandoned.

[51] Int. Cl.$^3$ .................. C08L 67/00; C08L 69/00
[52] U.S. Cl. ..................... 525/439; 264/176 R
[58] Field of Search ................ 525/439; 264/176 R

[56] References Cited

U.S. PATENT DOCUMENTS

| | | | |
|---|---|---|---|
| 3,218,372 | 11/1965 | Okamura et al. | 525/439 |
| 3,299,172 | 1/1967 | Schade et al. | 525/444 |
| 3,413,379 | 11/1968 | Schade et al. | 525/444 |
| 4,367,317 | 1/1983 | Fox et al. | 525/439 |

*Primary Examiner*—Jacob Ziegler
*Attorney, Agent, or Firm*—Hedman, Gibson, Costigan & Hoare

[57] ABSTRACT

Novel copolymers are prepared by the interaction of a melt mix of a high molecular weight or low molecular weight bisphenol A polycarbonate polymer and a high molecular weight diprimary dialcohol polyester polymer such as polyethylene terephthalate polymer. The resulting copolymers are transparent, relatively tough and are useful as glazing materials or molding compounds and are capable of maintaining dimensional stability at temperatures approaching their glass transition temperature.

4 Claims, No Drawings

COPOLYMERS AND PROCESS FOR THEIR PREPARATION

This is a continuation of application Ser. No. 188,177, filed Sept. 17, 1980, abandoned.

BACKGROUND OF THE INVENTION

The subject invention relates to novel copolymers prepared by the interaction of a melt mix of a high molecular weight bisphenol-A polycarbonate polymer, or a low molecular weight bisphenol-A polycarbonate polymer and a high molecular weight diprimary dialcohol polyester polymer, such as a polyethylene arylate, and to the process for their manufacture. The subject invention also provides a process which enables the building of the molecular weight of the combined polymers at lower temperatures than required for the polycarbonate alone.

DESCRIPTION OF THE INVENTION

It has been found that diprimary dialcohol polyesters, such as polyethylene arylates and more specifically, polyethylene terephthalate are not compatible with bisphenol-A polycarbonates, and that by co-reacting a blend or melt mix of the two, they can be compatibilized.

According to the process of the subject invention, a melt mix of high molecular weight polyethylene arylate and a high molecular weight bisphenol-A polycarbonate is prepared by extrusion through a simple extruder to yield an intimate blend of the two polymers. The blend is not compatible, has two glass transition temperatures (Tg), and is only partially soluble in polycarbonate solvents, such as chloroform and tetrachloroethane, and the polyethylane arylate has a tendency to crystallize. When this blend is heated to a temperature of about 260±20° C. with stirring under vacuum of less than 1 millimeter of pressure (mercury) for about 30–60 minutes, the resulting product has gained in molecular weight as determined by measuring its intrinsic viscosity. It now exhibits only one Tg between the respective Tg's of the two components. It no longer has a tendency to crystallize, it is soluble in solvents which do not dissolve polyethylene arylates, for example, chloroform or tetrachloroethane, and it is not separable into its two components. The novel copolymer thus produced possesses the valuable uses and properties hereinabove mentioned.

The subject process also produces similar novel copolymers when a melt mix of a low molecular weight bisphenol-A polycarbonate and high molecular weight polyethylene arylate, produced by extrusion, is reacted as set forth above, In an alternative procedure, blends of high molecular weight polyethylene arylates and high molecular weight bisphenol-A polycarbonates, as well as blends of high molecular weight polyethylene arylates with low molecular weight bisphenol-A polycarbonates are homogenized and interpolymerized by heating for approximately one hour at about 260±20° C. under an inert atmosphere, such as nitrogen, and with stirring. However, the molecular weight of the copolymers is not increased by heating under nitrogen.

A preferred polyethylene arylate which is employed in the subject invention is high molecular weight polyethylene terephthalate having an intrinsic viscosity (IV) of about 0.5 dl./g. or greater as measured in a solvent mixture of 60 parts by weight of phenol and 40 parts by weight of tetrachloroethane at 25° C. This particular solvent mixture is necessary for determining the intrinsic viscosity (IV) of polyethylene arylate, alone, or in incompatible blends with polycarbonates. Another example is polyethylene isophthalate.

As a high molecular weight bisphenol-A polycarbonate, it is preferred to employ one having an intrinsic viscosity (IV) of at least about 0.5 dl/g. as measured in chloroform at 25° C.

In the case of blending the components, the proportions may be varied. Thus, the bisphenol-A polycarbonate may constitute 90 to 40 percent of the blend and the polyethylene arylate 10 to 60 percent of the blend. However, it is most preferred to employ proportions of the polyethylene arylate and the bisphenol-A polycarbonate comprising 50 to 30 percent of the former and 50 to 70 percent of the latter.

Glass transition temperatures are measured, for example, on a Perkin-Elmer DSC-II.

The subject invention is further described in the examples which follow. These examples are preferred embodiments of the invention, and are not to be construed in limitation thereof.

EXAMPLE I

Equal proportions of high molecular weight bisphenol-A polycarbonates polymer having an intrinsic viscosity (IV) of 0.5 dl./g. and high molecular weight polyethylene terephthalate having an IV of 0.7 dl./g. are mixed and extruded through a single screw extruder. The extruded material has an IV of 0.65 dl./g. as measured in the same solvent mixture and at the same temperature as is the polyethylene terephthalate. It is a semi-incompatible mixture with a portion being soluble in chlorinated solvent and a portion, the polyethlene terephthalate, being insoluble. The mixture which shows a tendency to crystallize, has two glass transition temperatures (Tg's), one at approximately 83° C., and the other at approximately 150° C.

The extruded material is heated at 270° C., in a stirred reactor under a vacuum of less than 1 mm. mercury for 60 minutes. The final product is a true copolymer which has no tendency to crystallize, and has an IV of 0.91 dl./g. It is completely soluble in chlorinated solvents, and has one Tg at approximately 112° C. It is tough and completely transparent.

EXAMPLE II

Extruded material as prepared in Example I is heated at 270° C. in a stirred reactor with nitrogen sweep for 60 minutes. The copolymer obtained shows no tendency to crystallize, is completely soluble in chlorinated solvents, and has one Tg at approximately 111° C. It is tough and transparent. It has an IV of 0.60 dl./g.

EXAMPLE III

Equal proportions of a low molecular weight bisphenol-A polycarbonate having an IV of 0.1 dl./g. and high molecular weight polyethylene terephthalate having an IV of 0.7 dl./g. are mixed in a stirred reactor at 270° C. under a vacuum of less than 1 mm. mercury for 60 minutes. The copolymer obtained (which shows no tendency to crystallize) has an IV of 0.53 dl./g. It is completely soluble in chlorinated solvents and has one Tg at approximately 107° C. It is tough and transparent.

EXAMPLE IV

Equal proportions of a low molecular weight bisphenol-A polycarbonate having an IV of 0.1 dl./g. and high molecular weight polyethylene terephthalate having an IV of 0.7 dl./g. are mixed in a stirred reactor at 265° C. under a nitrogen sweep for 60 minutes. The copolymer obtained, which shows no tendency to crystallize, is completely soluble in chlorinated solvents and has one Tg at approximately 105° C. It has an IV of 0.3 dl./g. It is completely transparent, but lacks toughness due to low IV.

EXAMPLE V

High molecular weight bisphenol-A polycarbonate polymer (75 pts.) having an IV of 0.5 dl./g. and high molecular weight polyethylene terephthalate (PET) (25 pts.) having an IV of 0.7 dl./g. are mixed and extruded through a single screw extruder. The extruded material has an IV of 0.65 dl./g. It is a semi-imcompatible mixture with a portion being soluble in chlorinated solvent and a portion, the PET, being insoluble. The mixture which shows a tendency to crystallize has two glass transition temperatures (Tg's) one at approximately 84° C. and the other at approximately 142° C.

A portion of the extruded material is heated at 270° C. in a stirred reactor under a vacuum of less than 1 mm for 60 mins. The final product is a copolymer which has no tendency to crystalize and has an IV of 0.79 dl./g. It is completely soluble in chlorinated solvents and has one Tg at approximately 128° C. The product is tought and transparent.

EXAMPLE VI

A portion of the extruded material from Example V is heated at 270° C. in a stirred reactor with a nitrogen sweep for 60 minutes. The copolymer obtained shows no tendency to crystalize, is completely soluble in chlorinated solvents and has one Tg at approximately 125° C. The product is tough and transparent with an IV of 0.60 dl./g.

The foregoing detailed description will suggest many variations to those skilled in this art. All such variations are within the full scope of the appended claims.

We claim:

1. A copolymer of a high molecular weight polyethylene arylate and a low or high molecular weight bisphenol A polycarbonate, said copolymer being of high molecular weight, transparent, being completely soluble in chlorinated solvents, and having one glass transition temperature.

2. A copolymer in accordance with claim 1, wherein the polyethylene arylate is a high molecular weight polyethylene terephthalate having an intrinsic viscosity of at least about 0.5 dl./g. as measured in a 60:41 mixture of phenol and tetrachloroethane at 25° C. and the bisphenol A polycarbonate has an intrinsic viscosity of about 0.1–0.5 dl./g. as measured in a 60:40 mixture of phenol and tetrachloroethane at 25° C.

3. A copolymer in accordance with claim 1, wherein the polyethylene arylate is a high molecular weight polyethylene terephthalate having an intrinsic viscosity of about 0.5 dl./g. as measured in a 60:40 mixture of phenol and tetrachloroethane.

4. A copolymer in accordance with claim 1, wherein the copolymer is of proportions of the specified arylate and polycarbonate corresponding to from 50 percent to 30 percent of the former to from 50 percent to 70 percent of the latter.

* * * * *